United States Patent [19]

Gersbacher

[11] 4,128,235

[45] Dec. 5, 1978

[54] BRAZE FIXTURE

[75] Inventor: Harry C. Gersbacher, Dayton, Ohio

[73] Assignee: United Aircraft Products, Inc., Dayton, Ohio

[21] Appl. No.: 829,881

[22] Filed: Sep. 1, 1977

[51] Int. Cl.² .............................................. B23K 37/04
[52] U.S. Cl. ...................................... 269/234; 29/726; 228/183; 228/212; 269/287; 269/303; 269/321 W
[58] Field of Search .................... 269/289 R, 234, 287, 269/303, 321 W; 29/726; 228/183, 212

[56] References Cited

U.S. PATENT DOCUMENTS

| 1,629,780 | 5/1927 | Dippert | 29/726 |
| 1,818,593 | 8/1931 | Walworth | 29/726 X |
| 1,907,006 | 5/1933 | Ritter | 29/726 |
| 3,069,153 | 12/1962 | Brown | 269/287 X |
| 4,053,969 | 10/1977 | Bayard | 228/183 X |

Primary Examiner—Leon Gilden
Attorney, Agent, or Firm—J. E. Beringer

[57] ABSTRACT

A fixture useful both to receive and position parts assembled for brazing and to hold the assembled parts during the brazing process. Part locators in the fixture position the parts during assembly or loading, and remain attached to the fixture during brazing. The locators are influenced to maintain an engagement with assembled parts but are able to yield in controlled directions under expansion resulting from the heat of brazing. The result is to obviate distortion in the brazed article.

12 Claims, 6 Drawing Figures

U.S. Patent     Dec. 5, 1978     4,128,235
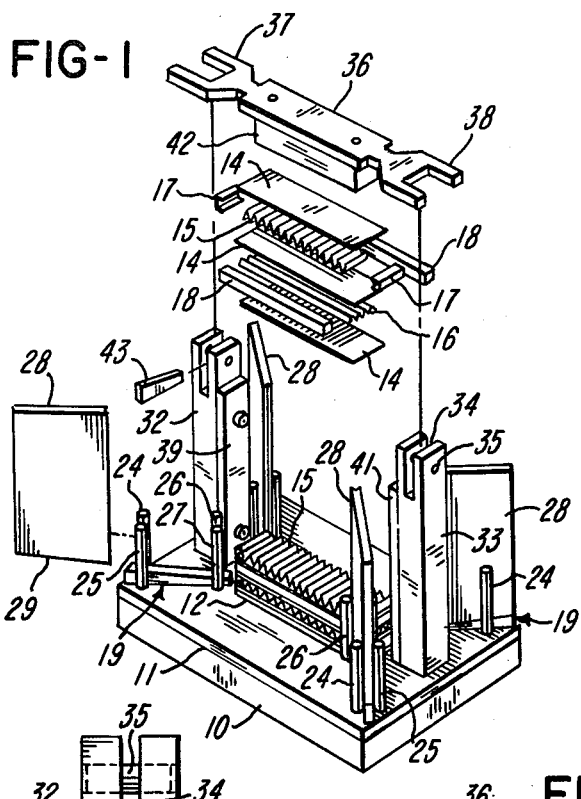
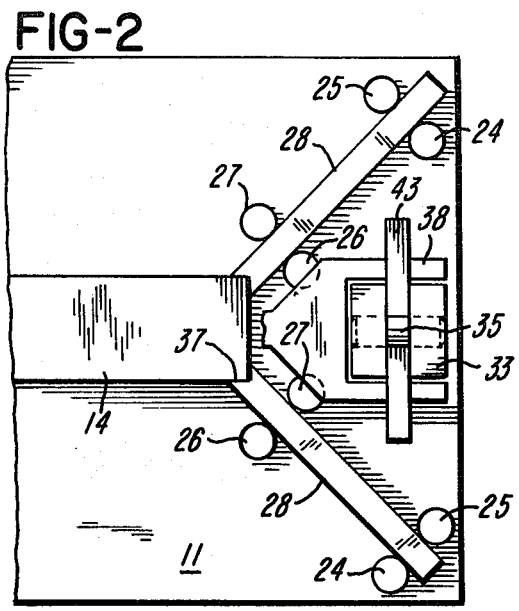
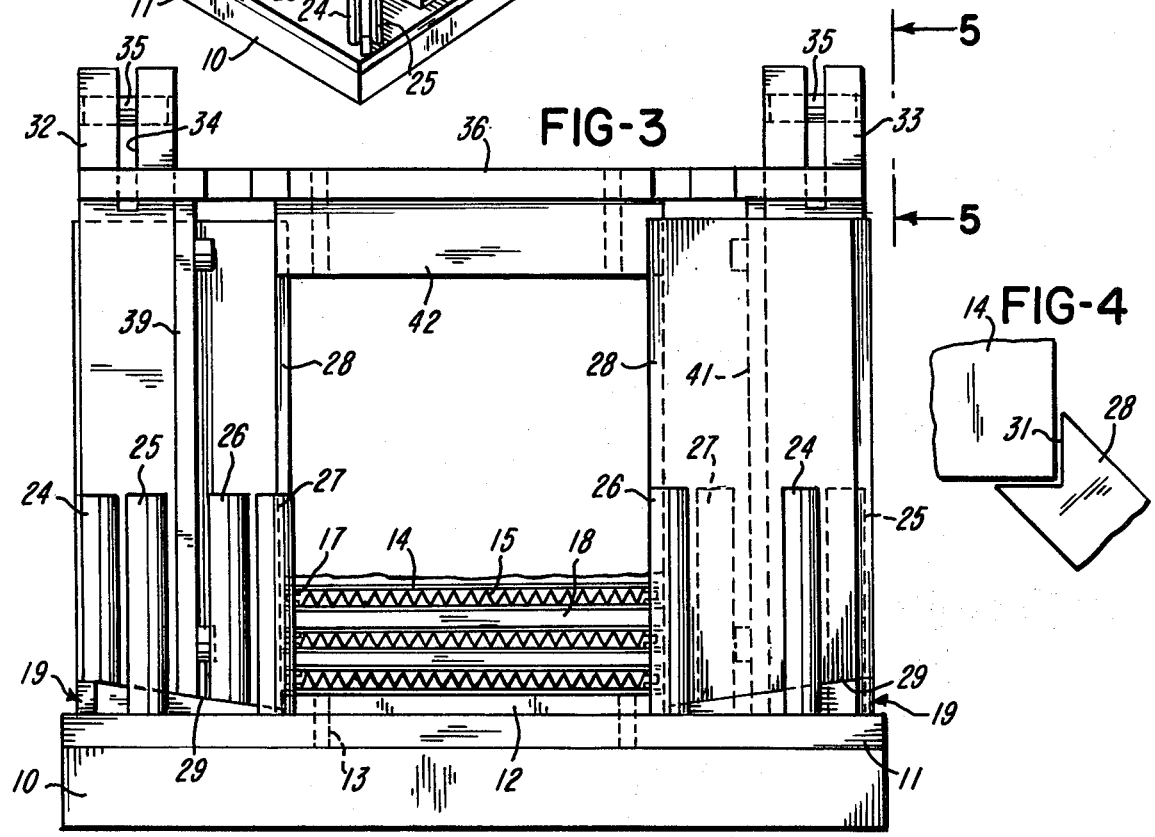
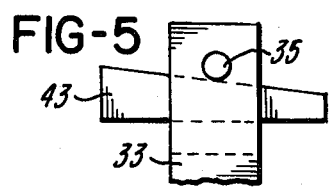
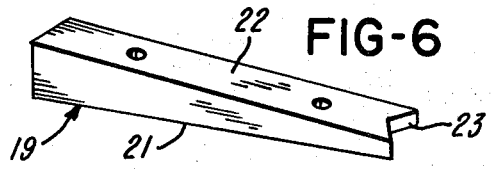

BRAZE FIXTURE

BACKGROUND OF THE INVENTION

1. Field of the Invention

This invention relates to braze fixtures, and especially to fixtures used in the brazing of plate type heat exchangers in which multiple plate and corrugated fin elements, and appropriate spacers, are stacked upon one another, held so that the parts maintain an assembled relation and brazed to form a unitary heat exchange core or device. In this operation, fixtures play a part both in defining a configuration to receive and position stacked parts and in holding the parts assembled during brazing.

2. Description of the Prior Art

Braze fixtures of the prior art are known which include locators to define a configuration of square-like or other shape corresponding to the peripheral outline of the heat exchanger. Upon an assembled heat exchanger being brazed, however, it has been necessary to effect prior removal of the locators in order to accommodate expansion of the parts as they are heated in the brazing process. Removal of the locators, however, leaves the assembled heat exchanger vulnerable to distortion and to collapse or protrusion of individual components. This is a particular hazard in working with very thin materials and with relatively elongated parts not inherently resistant to distorting pressures. Insofar as is known, the prior art contains no teaching adequately dealing with this problem. Workers in the art attempt by precise assembly and by carefully controlled techniques to reduce distortion to a tolerable level. Still, rectangular or square heat exchangers which come out of the brazing process out of square or otherwise distorted are not uncommon in heat exchange fabrication. Any known prior attempts to cope with the problem are in the field of clamps, which, if made tight, restrain normal expansion of the parts, and, if made loose, fail in their intended purpose.

The foregoing discussion embodies a disclosure of all of the prior art of which those substantially involved in the preparation of this application for patent are aware, material to the question of patentability of the invention, and is intended as compliance with added Section 1.97 of Title 37 of the Code of Federal Regulations.

SUMMARY OF THE INVENTION

The present invention is directed to a solution of the above discussed and sloping downward problems of the prior art. In the brazing art it provides a fixture having locators properly positioning stacked parts in accordance with the desired heat exchanger configuration. The formed heat exchanger, while remaining in the same fixture and without moving or altering the position of the locators, is subjected to brazing. The locators, according to concepts of the invention, are influenced by gravity to occupy a parts locating position and are capable of a controlled, sliding motion. In the brazing process, an engaged relation of the locators with the assembly of parts is maintained throughout temperature rise and without the imposing of restraints to a free expansion of the parts. A correct, in-line, relationship of the parts is assured, leading to a simple, relatively trouble free production of brazed assemblies substantially free of distortion.

An object of the invention is to provide a braze fixture substantially in accordance with the foregoing.

Other objects and structural details of the invention will appear from the following description, when read in connection with the accompanying drawings, wherein:

FIG. 1 is a view in exploded perspective of a braze fixture in accordance with the illustrated embodiment of the invention;

FIG. 2 is a top plan view of the braze fixture of FIG. 1, showing only one end thereof;

FIG. 3 is a view in side elevation of the braze fixture of FIG. 1, one parts locator being removed and wedge shaped locking devices being omitted;

FIG. 4 is a detail view, enlarged relatively to FIG. 2, showing the cooperative relationship of a braze assembly and of a parts locator;

FIG. 5 is a detail, fragmentary view, taken substantially along the line 5—5 of FIG. 3; and FIG. 6 is detail view of an inclined ramp device, one of which serves as a mount for each parts locator.

DESCRIPTION OF PREFERRED EMBODIMENT

Referring to the drawings, a braze fixture according to the illustrated embodiment of the invention includes a base casting 10 overlaid by a machined plate 11, the assembly comprising members 10-11 forming a relatively heavy and stable base plate. Superposing on the upper surface of plate 11, in a centrally located portion thereof, is a mounting plate 12. Dowel pins 13 precisely position the plate 12 and hold it against shifting motion relatively to plate 11. The plate 11 has a rectangular configuration and provides a floor or base upon which core parts of a plate type heat exchanger of like configuration are stacked for assembly prior to brazing. As only partly illustrated herein, such a heat exchanger core may comprise vertically spaced apart plates 14 alternated with corrugated fin strips 15 and 16 and with end and side marginal spacers 17 and 18. The parts may include overlays or coatings of a braze alloy or braze material, and, it will be understood that when the parts are stacked one upon another in the desired order there is defined the core of a heat exchanger in which passages in a transverse relationship to one another flow fluids of different temperature for a transfer of heat through the plates 14. While the parts are so stacked, the assembly is subjected to a brazing operation which may include heating and cooling steps during which the braze alloy flows and forms a seal and a bond between adjacent, contacting parts. The many parts, which, in assembly, loosely superpose one upon another are in this way united into an integrated structure.

Further comprised in the braze fixture are four inclined ramps 19, one of which is stationed at each corner of the mounting plate 12. Each ramp 19 is suitably fixed to the upper surface of plate 11 and occupies a plane which intersects a respective mounting plate corner and is at an angle of approximately 45° to end and side walls which join to define the respective corner. As indicated in FIG. 6, each ramp 19 is wedge shaped, having a flat lower surface 21 to seat to plate 11, and an upper surface 22 which slopes uniformly from one end to the other. In what may be regarded as the lower or relatively depressed end of the ramp is an indented formation in the shape of a V notch 23, side walls of the notch defining a right angle. In its orientation relative to the mounting plate 12, each ramp 19 projects divergently from a respective plate corner and has its indented end 23 in substantially embracing relation thereto. At each of the four corners of the mounting plate 12, therefore, there is a ramp 19 having a surface 22 sloping downwardly toward the plate corner.

Also fixed in the plate 11, as by being pressed into surface recesses therein, are sets of posts 24–25 and 26–27 associated with each ramp 19. Thus, an opposite sides of each ramp 19, at the higher or relatively elevated end thereof, are upstanding posts 24–25. At the other or relatively depressed end of the ramp are upstanding posts 26–27, on respectively opposite sides of the ramp. Each two sets of posts 24–25 and 26–27 perform a guiding function in connection with a respective parts locator 28 which has a sliding mount on a respective ramp 19. Each parts locator 28 has a plate-like form, being generally rectangular in configuration. One end is cut off to have a uniformly sloping surface 29 like the slope on ramp 19. The locators mount in the fixture in upright fashion, resting at respective sloping ends 29 on respective ramps 19. They have a length which, taken with the height of ramps 19, equals or exceeds the expected height of a heat exchanger core to be assembled in the fixture. The locators have a slip fit between the sets of posts 24–25 and 26–27 and are slidable on respective ramps in approaching and separating senses relatively to the mounting plate 12 and to heat exchanger parts assembled thereon. Confined and guided by the posts 24–25 and 26–27, they move in the same place occupied by the ramps on which they are supported. The width of the locators substantially agrees with the length of ramps 19. As mounted on the ramps, the locators present inwardly orienting side edges for cooperation with a corner of an assembled heat exchanger and the presented side edges are indented to have V notches 31. The indented formation is continuous throughout a relatively elongated length of the inwardly orienting side edges and is adapted substantially to align with an indented formation 23 on an underlying ramp 19. Side walls of each notch 31, like side walls of each notch 23, describe a right angle. By reason of the sloping surface 29, mating with ramp surface 22, the inwardly positioned indented side edge of each locator 28 is substantially perpendicular to the surface of plate 11 and hence is substantially parallel to sides of a heat exchanger assembly as stacked on mounting plate 12.

A pair of pillars 32 and 33 are fixed to the base plate and project upwardly therefrom. The pillars are in a spaced relation to one another beyond and at opposite ends of mounting plate 12. Their centers are in a common line which may be regarded as an extension of the longitudinal axis of plate 12. Each rises above the expected height of an assembled heat exchanger and has a bifurcated upper end defining a slot 34. Near its upper end, slot 34 is intersected by a pin 35 anchored at its ends in the opposing arms presented by the bifurcated structure. A pressure applying member 36 overlies the mounting plate 12 and has yoke-like ends 37 and 38. These embrace respective pillars 32 and 33 with the result that member 36 is mounted thereon for vertical reciprocating motion toward and away from the mounting plate 12. Fastened to inwardly facing sides of the pillars 32 and 33 are plates 39 and 41 which limit motion of member 36 toward plate 12, and provide a position of rest therefore. Dependent from member 36 is a weighted extension 42 thereof adapted for direct contact with the heat exchanger assembly. A wedge-shaped device 43 is adapted to be inserted in slot 34, between a respective yoke shaped end of member 36 and the pin 35. Driving of a device 47 in place, at each pillar 32 and 33, exerts downward pressure on member 36 and releasably locks the pressure applying member in a downwardly projected position.

In use of the braze fixture, pressure applying member 36 will initially be removed. Parts of the heat exchanger are put in place, one upon another and in a proper sequence, in the area defined by mounting plate 12. At the time of or following stacking of the heat exchanger parts, the parts locators 28 are adjusted inwardly or downwardly along ramps 19. Indented side edges thereof provide surfaces which achieve an adjacent, substantially parallel relation to end and side surfaces of the parts assembly. Together, the indented edge portions of the several locators effectively define a rectangular enclosure within which the parts assembly is received and held against inadvertent dislocation. With the heat exchanger core fully assembled and completely contained at its corners by the parts locators 28, member 36 is fitted over pillars 32 and 33 and lowered thereon until extension 42 comes to rest on the top plate of the heat exchanger structure. When this occurs, wedges 43 are driven into place in slots 34, and, in the process, pressure applying member 36 and its extension 42 are forced incrementally downward. The applied pressure, together with reactant pressure exerted through mounting plate 12, places the assembled core under compression. Parts assume an intimately contacting relation to one another, establishing conditions important to the obtaining of a good braze. At the same time, the parts locators 28, under applied gravity forces, secure the heat exchanger core at its four corners. It will be understood, in this connection, that locators 28 are relatively heavy plate-like elements influenced by their mount on ramps 19 to make a positive containment of the relatively light parts which make up the assembled core.

With the parts so assembled, and the elements of the fixture adjusted as described, the fixture with its contained assembly of parts is subjected to brazing steps. It may, for example, be placed in a furnace wherein the temperature is raised to a value sufficiently high to cause the braze alloy or braze material, present as a coating, foil or the like between parts, to flow but not so high as to cause melting or softening of the material of which the parts themselves are made. Upon the furnace temperature being reduced from such high value, and the fixture removed from the furnace, the braze alloy will be found to have distributed itself between mating parts surfaces and to have penetrated minute cracks and crevices, and, in cooling and hardening, to have united the parts of the heat exchanger core into a one-piece unitary structure.

In the furnace, and during the time period in which the temperature is raised and in which it may be held at an elevated value, the plates, spacers and fin material of which the heat exchanger core is comprised, respond to higher temperatures by expanding. According to the instant invention, this expansion is not prevented nor is it allowed to occur in an uncontrolled manner. Rather is the expansion directed and controlled so that it can take place without producing distortion in individual parts or in the assembly of parts. Thus, parts locators 28 engage corners of the core assembly in a manner to inhibit endwise and lateral displacement of spacer and plate parts. When, under the influence of rising temperature, these parts expand, the forces of expansion are controlled so that they can be applied only in a direction to displace locators 28 upwardly along their respective ramps 19. In so moving, the locators continue to engage corners of the core assembly and under gravity influence continue to maintain positions of containment relatively to the core structure. A cooling heat exchanger core continues to be held against warping or out of square distortion as the locators 28 ride down the ramps 19 in a following motion.

The fixture has been disclosed as functioning in connection with a plate type heat exchanger core. It will be evident, however, that it may be used with any braze assembly in which multiple parts are liable to get out of line or otherwise be distorted as a consequence of the brazing operation. Modifications in the structure of the fixture, within the concepts of the invention, are, of course, possible. Use of the mounting plate may be unnecessary since the parts can be stacked directly upon the plate 11. Some form of pressure applying member will ordinarily be desirable to place the braze assembly under compression from top to bottom. The particular form of pressure applying means as here shown, however, including member 36 and wedges 43, may be unessential to a successful practice of the invention. Extension 42 of the pressure applying member is made to an outline configuration and is given a length consistent with dimensions of the assembly of parts to be placed under compression. The extension is releasably secured to the plate 36 and may be replaced by other extensions appropriate in length and peripheral outline to changing requirements of the work.

What is claimed is:

1. A fixture useful in positioning and holding parts stacked therein to form an assembled heat exchanger or the like and in holding said parts in an assembled relation during brazing, including:
   (a) a base plate providing a multi-sided area within which heat exchanger components corresponding in configuration to said area are stacked one upon another;
   (b) part locators of plate-like form mounting on end to stand upright from said base plate;
   (c) upright side edges of said locators being presented to corners of said area and having portions to engage with respective corners of parts stacked in said area; and
   (d) means influencing a movement of said locators toward respective corners of said area, said means yielding to allow an expansion of said parts during brazing while maintaining an engaged relation of said locators with corners of an assembly of stacked parts.

2. A fixture according to claim 1:
   (a) inclined slide means on said base plate mounting said part locators and slopingdownward toward respective corners of said area;
   (b) said part locators having a sliding mount on said inclined slide means whereby force of gravity influences movement of said locators toward an engaged relation with stacked parts; and
   (c) said locators being allowed freely to ride up said inclined slide means in response to expansion of said parts.

3. A fixture according to claim 2:
   (a) means being provided to confine and guide said part locators in their movement on said slide means.

4. A fixture according to claim 3:
   (a) wherein posts upstand from said base plate and define slide ways therebetween for said part locators;
   (b) said part locators each having a slip fit between adjacent posts.

5. A fixture according to claim 3:
   (a) said inclined slide means being defined by wedge shaped members on said base plate;
   (b) said part locators mounting on end on respective wedge shaped members; and
   (c) said means to confine and guide said part locators being posts set in said base and upstanding therefrom along side said wedge shaped members.

6. A fixture according to claim 1:
   (a) said part locators occupying planes approximately 45° to sides of said multi-sided area;
   (b) the said upright side edges of said part locators being indented to interfit with corners of assembled heat exchanger parts.

7. A fixture according to claim 6:
   (a) said multi-sided area having four sides;
   (b) a part locator positioning divergently of said area at each corner thereof;
   (c) mounting pillars projecting perpendicularly of said base plate between adjacent part locators outside the confines of said multisided area; and
   (d) means supported on said pillars in an overhead relation to said mounting area and positionable on said pillars to cooperate with said base plate in applying a vertical compression to stacked heat exchanger parts.

8. A fixture according to claim 7:
   (a) means being provided for releasably locking said supported means against a relaxation of applied compression.

9. A braze fixture useful in positioning and holding parts stacked therein to form an assembled heat exchanger or the like and in holding said parts in an assembled relation during brazing, including:
   (a) part locators positionable on said base plate to accept and locate an assembly of stacked parts;
   (b) said part locators being mounted on inclined surfaces on said base plate and being displaceable thereon responsively to expansion of said parts in a manner to apply their weight in a holding of said assembly during brazing without interfering with a free expansion of said parts; and
   (c) means confining and guiding said part locators in their movements.

10. A braze fixture according to claim 8:
    (a) said base plate having inclined ramps thereon defining said inclined surfaces.

11. A braze fixture according to claim 9:
    (a) said confining and guiding means having the form of posts upstanding from said base plate along side said ramps;
    (b) said part locators each having a plate-like form and being mounted on end on said ramps;
    (c) said locators each presenting a vertically elongated side edge adapted to engage a portion of an assembly of stacked parts.

12. A braze fixture according to claim 11,
    (a) the assembly of stacked parts having a rectangular configuration;
    (b) said part locators being guided for movement in respective planes at about 45° to sides of said assembly; and
    (c) vertically side edges of said locators interfitting with corners of said assembly.

* * * * *

UNITED STATES PATENT OFFICE
CERTIFICATE OF CORRECTION

PATENT NO. : 4,128,235
DATED : December 5, 1978
INVENTOR(S) : H. C. Gersbacher

It is certified that error appears in the above-identified patent and that said Letters Patent are hereby corrected as shown below:

Column 1, line 50, delete "sloping downward" and substitute -- related --;

Column 3, line 27, delete "place" and substitute -- plane --;

line 63, delete "therefore" and substitute -- therefor --;

Column 6, after line 38, insert -- (a) a base plate; --;

line 39, change "(a)" to -- (b) --;

line 41, change "(b)" to -- (c) --;

line 47, change "(c)" to -- (d) --;

line 49, change "8" to -- 9 --;

line 52, change "9" to -- 10 --; and line 66, after "vertically" insert -- elongated --.

Signed and Sealed this

Twelfth Day of June 1979

[SEAL]

Attest:

RUTH C. MASON
Attesting Officer

DONALD W. BANNER
Commissioner of Patents and Trademarks